Feb. 9, 1954 R. L. JOY 2,668,638
SEED DISTRIBUTOR
Filed July 28, 1949 3 Sheets-Sheet 1
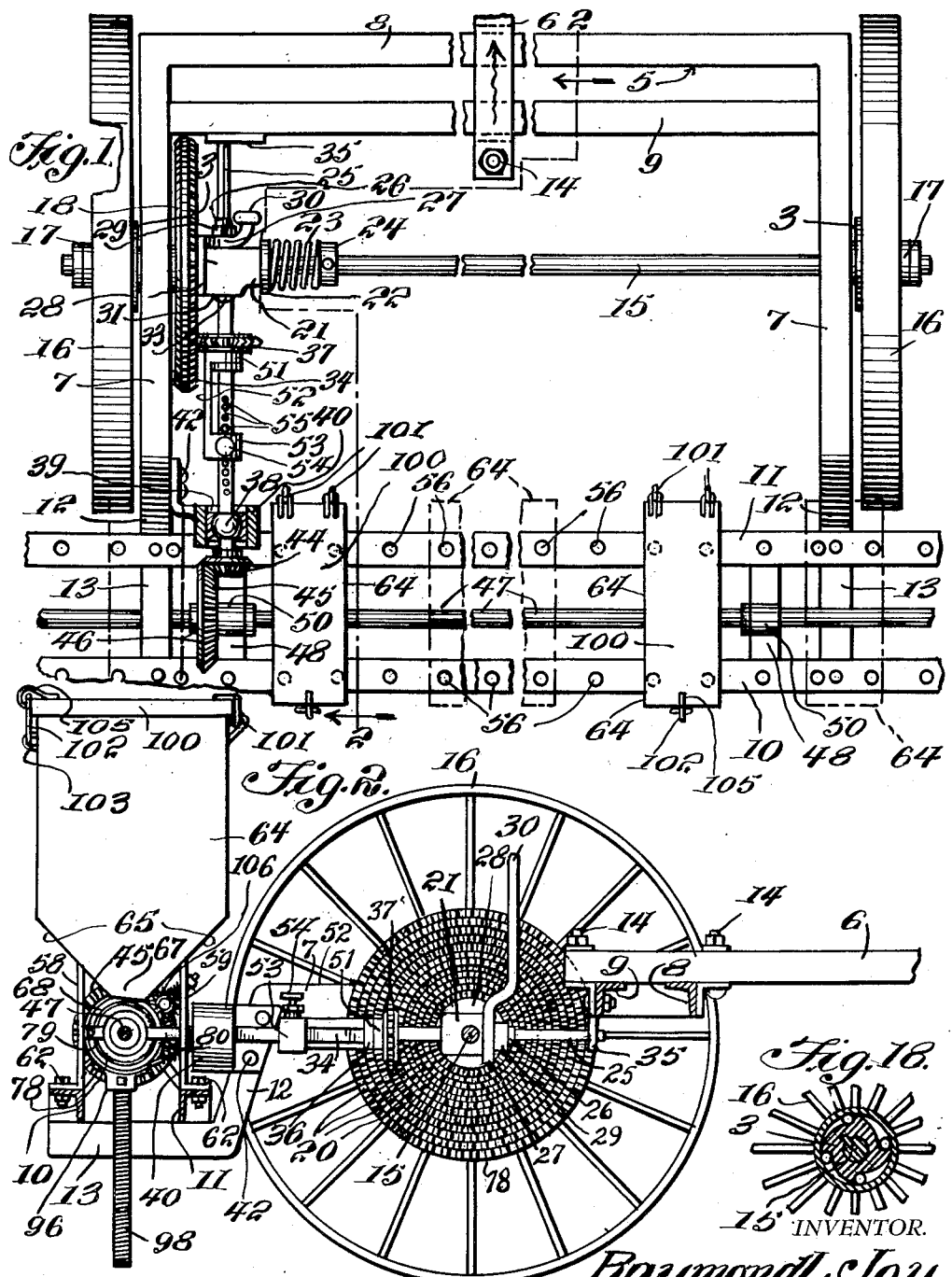
INVENTOR.
Raymond L. Joy,
BY Victor J. Evans & Co.
ATTORNEYS

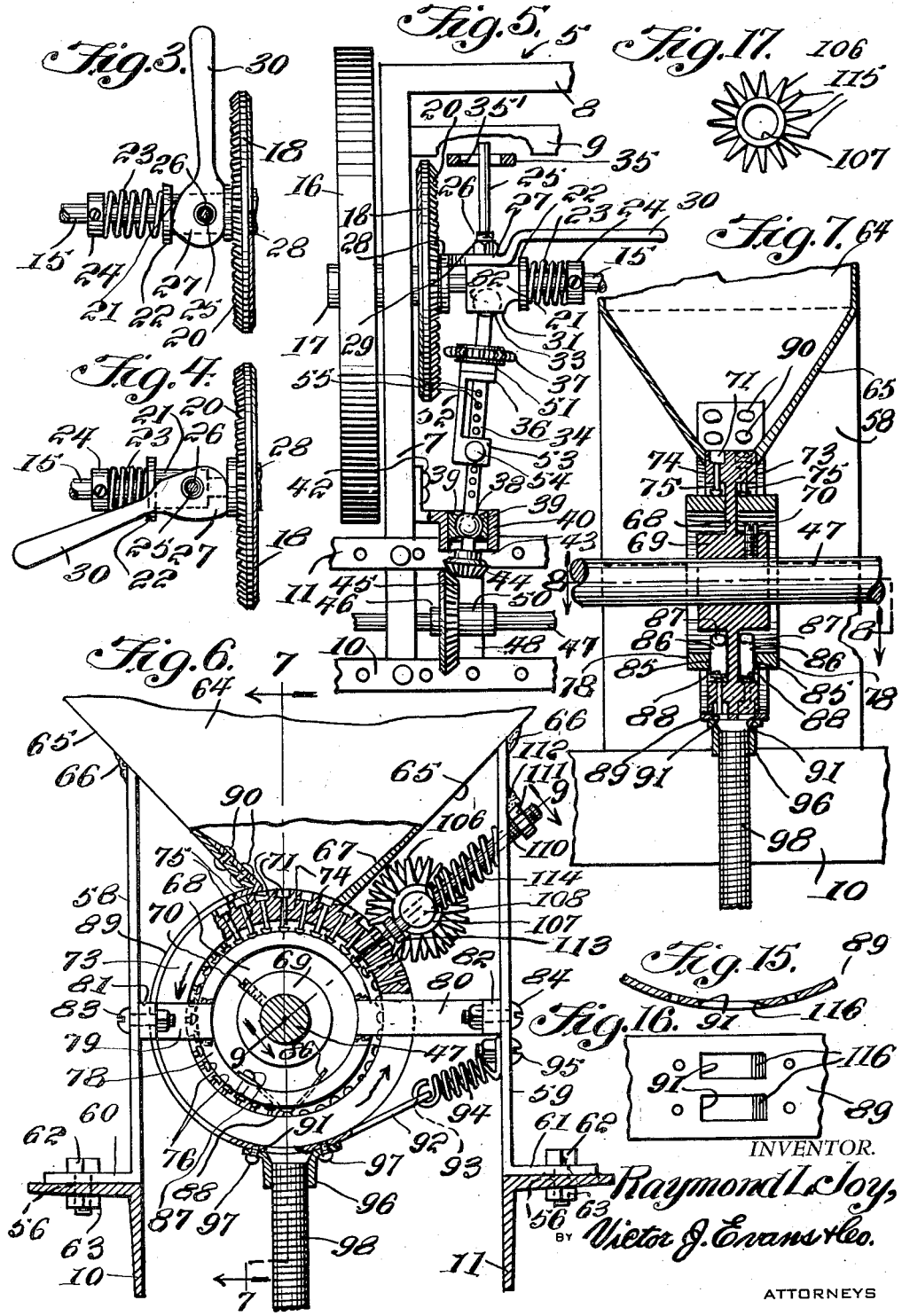

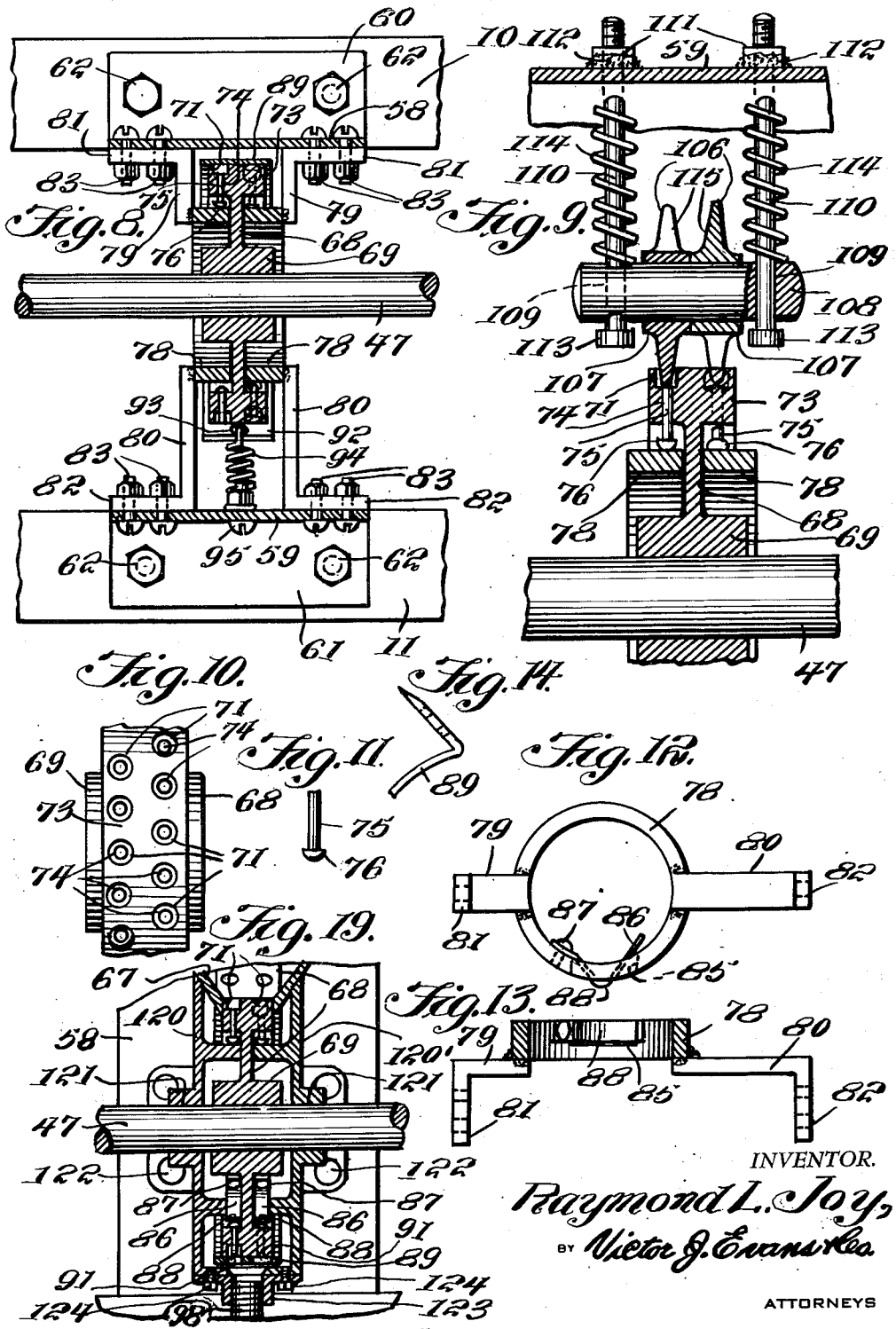

Patented Feb. 9, 1954

2,668,638

UNITED STATES PATENT OFFICE 2,668,638

SEED DISTRIBUTOR

Raymond L. Joy, Prosser, Wash., assignor, by decree of distribution, to Laura M. Joy Application July 28, 1949, Serial No. 107,276

6 Claims. (Cl. 222—139)

1

The present invention relates to farm implements, and more particularly to a seed distributor.

One object of the invention is to provide a combined dispensing and distributing implement for farm use which is adapted to distribute seeds or the like in rows various distances apart.

Another object is to provide a seed distributor in which the seeds may be dispensed various spaced apart distances in zig-zag rows.

Another object is to provide a seed dispenser and distributor for planting different types of seeds of a large variety of plants to adapt the machine for universal farm use.

Another object is to provide a dispensing and distributing farm implement in which the seeds or other material being distributed and planted are positively controlled by means of a rotary projector associated with the feed hopper such that a single seed will be planted at every predetermined spaced apart location.

Another object is to provide a seed distributing and dispensing implement which can be selectively controlled through the medium of variable gearing to dispense seeds and the like in a plurality of spaced apart rows with the seeds spaced various distances apart of equal linear spacing.

Another object is to provide a dispensing and distributing implement for seeds and other material in which a countershaft is adapted to be driven at various speeds by the traction wheels of the implement, and to arrange a plurality of seed or material dispensing mechanisms along said shaft in different spaced apart distances to dispense material such as seeds and the like in longitudinally spaced apart parallel rows.

Other objects and advantages of the invention will become apparent during the course of the following description taken with the drawings, wherein:

Figure 1 is a top elevational view of the dispensing and distributing implement showing portions thereof broken away and in section to illustrate various structural details.

Figure 2 is a vertical cross-sectional view taken on the irregular line 2—2 of Figure 1, and showing the change speed gearing for driving the dispensing and distributing mechanism at various speeds.

Figure 3 is an enlarged fragmentary side elevational view of the gearing control mechanism showing the driven gear in meshing relation with the drive gear.

Figure 4 is a side elevational view similar to Figure 3, showing the driven gear shaft and the

2 control lever therefor in a position to disengage the drive and driven gears.

Figure 5 is a fragmentary top elevational view showing the control lever for the driven gear positioned to disengage the driven gear from the drive gear.

Figure 6 is an enlarged fragmentary side elevational view of one of the seed dispensing and distributing units showing portions thereof broken away to illustrate various structural details of the ejecting mechanism and plunger moving means.

Figure 7 is a vertical cross-sectional view taken on line 7—7 of Figure 6 and looking in the direction of the arrows to illustrate the manner in which the dispensing wheel of the seed planter is arranged, and the plunger pins for ejecting the seeds from the peripheral recesses.

Figure 8 is a fragmentary horizontal cross-sectional view taken on line 8—8 of Figure 7 and looking in the direction of the arrows to illustrate further structural details of the dispensing wheel.

Figure 9 is a fragmentary cross-sectional view taken on the oblique line 9—9 of Figure 6 looking in the direction of the arrows and showing the plunger pin depressing wheels with their teeth disposed to yieldingly engage the outer ends of the plunger pin.

Figure 10 is a fragmentary top elevational view of the seed dispensing wheel showing the manner in which the seed receiving recesses are arranged in zig-zag circumferentially spaced relation.

Figure 11 is a side elevational view of one of the plunger pins for ejecting the seeds.

Figure 12 is a side elevational view of one of the guide rings for retaining the plunger pins in position, and showing the ejector spring for discharging the seeds as they reach the limit of their downward travel.

Figure 13 is a top elevational view of one of the guide rings for guiding the plunger pins and illustrating the ring portion thereof in section to illustrate the location of the ejector spring.

Figure 14 is a side elevational view of the upper end of the control band.

Figure 15 is an enlarged fragmentary cross-sectional view of the control band showing the seed dispensing openings therein arranged to discharge the seeds at a point during the lower travel of the dispensing wheel.

Figure 16 is an enlarged fragmentary bottom elevational view of the control band showing the discharge openings arranged in side by side relation.

Figure 17 is a side elevational view of one of the plunger controlling star wheels showing the manner in which the plunger arranging teeth are radially arranged.

Figure 18 is a sectional view taken through one of the ground engaging wheels, showing the overrun clutch therein.

Figure 19 is a view similar to Figure 7, but showing a modified arrangement of the dispensing mechanism.

In the drawings, and more in detail, there is shown a wheeled frame generally designated 5 to which is attached a draft bar 6 adapted to be connected to a tractor or other farm power implement. The wheeled frame 5 includes side frame bars 7 connected at the front end by means of a frame bar 8 and reinforced by a transverse frame bar 9. The rear ends of the side frame bars 7 are connected by a pair of spaced angle irons 10 and 11, and said rear ends are offset by means of depending angular portions 12 to provide rearwardly extending projections 13, Figure 2. The draft bar 6 is connected to the transverse frame bars 8 and 9 by suitable angle brackets held in place by coupled nuts and bolts 14.

Journaled in suitable bearings carried by the side frame bars 7 (not shown) is a rotatable axle shaft 15 which projects beyond the side frame bars 7 and are provided with supporting wheels 16, the hubs 17 each of which has an overrun clutch 3 connected thereto. It is intended to form the supporting wheels 16 of a predetermined diameter such that the linear distance or forward travel of the frame 5 may be easily determined in selecting the spacing for the dispensing of seeds.

Affixed to the axle shaft 15 is the hub of a gear wheel 18 having a series of circular arranged gear teeth 20 to form concentric gears, each of which is increased by the number of teeth in multiples of four from the innermost gear to the outer ring gear. It is intended to provide the innermost ring gear 20 with approximately 16 teeth and the outer concentric gear 20 with 60 teeth, there being an overrun clutch 3 for each of the wheels 16.

Slidably mounted on the axle shaft 15 is a casting 21 having an annular flange 22 which is engaged by a coil spring 23 held in place by an abutment collar 24. Thus, the casting 21 is normally urged in the direction of the gear wheel 18. An extension 25 is formed on the casting and is provided with a threaded portion 26 on which is rotatably mounted a cam 27 having a lobe portion adapted to engage a washer plate 28 on the hub of the gear 18. The cam 27 is held in place by means of a nut 29 and a handle 30 is formed on the cam to control the movement thereof. An extension 31 is formed on the casting 21, and is provided with a spherical socket 32 for receiving the spherical end 33 of a squared shaft 34. The casting 21 is held against rotation by the extension or rod 25 being received in a slot 35' in a bracket 35 affixed to the web of the channel frame member 9. Rotatably mounted on the squared shaft 34 is the hub 36 of a gear wheel 37, and the hub 36 is provided with an opening or bore corresponding to the square sectional shape of the shaft 34 so that the gear 37 may slide to and fro on the shaft 34 and be selectively positioned in meshing engagement with one of the concentric rows of gear teeth 20 of the gear 18.

The other end of the squared shaft 34 is provided with a spherical portion 38 which is mounted between complementary spherical socket members 39 slidably mounted in a bearing bracket 40. The bearing bracket 40 is secured to one of the side frame members 7 by bolts or other fastening means 42.

Secured to the extreme free end of the shaft 34 is the hub 43 of a bevel gear 44 which is arranged to drivingly engage a bevel gear 45, which has its hub 46 affixed to a counter-shaft 47. The counter-shaft 47 is supported by suitable bearing brackets 48 extending between and connected to the transverse angle bars 10 and 11 at spaced apart locations (Fig. 1). The bearing brackets 48 are provided with suitable bearing bosses 50 for rotatably mounting the shaft 47 transversely of the implement and parallel with the shaft 15. The collar of the gear 37 as at 36 is grooved to receive a yoke member 51 having an extension 52 terminating in a slide 53 movable along the squared shaft 44. A detent plunger 54 is mounted in a slide 53 and is adapted to engage in one of a series of openings 55 in the squared shaft 34 to retain the slide 53 and gear wheel 37 in a preselected position.

The angle frame bars 10 and 11 extend a considerable distance beyond the ground engaging wheels 16 on both sides of the frame and similarly, the coaxial shaft 47 extends beyond the wheels to control a plurality of seed dispensing units supported by the angle frame bars 10 and 11.

The transverse frame bars 10 and 11 are provided with a series of openings 56 in one of their flanges which are spaced equal distances apart and a distance equal to the spacing of a pair of correspondingly formed openings in the foot portions of a pair of upstanding bracket plates 58 and 59 as at 60 and 61. The foot portions 60 and 61 rest upon the horizontal flanges of the transverse angle bars 10 and 11, and fastening bolts 62 are passed through the spaced openings in said foot portions 60 and 61 and through a pre-selected set of openings 56 in the upper flange of the angle bars 10 and 11 so as to receive retaining nuts 63, and thereby selectively hold the vertical bracket plates in position. The upper ends of the plates 58 and 59 are adapted to support a hopper 64 having converging walls 65, and said plates are welded to the converging wall portions 65 as at 66. The discharge end 67 of the hopper is disposed above the transverse shaft 47 and is shaped to conform to the peripheral contour of a discharge wheel 68 which has its hub 69 adjustably secured to the shaft 47 by means of a set screw 70. It is to be understood, that a plurality of dispensing means will be provided and supported between the horizontal angle bars 10 and 11 as desired, and that a description of one will suffice for all since they are identical in construction and operation. The peripheral surface of the dispensing wheel 68 is provided with a series of circumferentially spaced pockets 71 arranged in zigzag fashion (Figure 10) to provide a pair of sets of axially spaced openings extending circumferentially about the peripheral surface of the dispensing wheel with one thereof staggered relative to the other. The pockets 71 are formed in a widened or enlarged rim portion 73 of the wheel 68, and said rim is provided with bores 74 corresponding to the position of the pockets 71 for receiving a series of plunger ejectors 75. The plunger ejectors are provided with heads 76 which are adapted to engage guide rings 78 arranged one on each side of the wheel 68 and extending beneath the enlarged rim 73. The guide rings 78 are provided with angle brackets 79 and 80, and said angle brackets have their foot portions 81 and 82 secured to the upright plates 58 and 59 by means of threaded fasteners 83 and 84.

Formed in the guide rings 78 adjacent the lower portion thereof is a pair of openings 85 through which V-shaped leaf springs 86 project, and said springs are fastened in place by rivets or the like 87. The apex 88 of the springs 86 projects through the openings and is adapted to engage the enlarged heads 76 of the ejector plungers 75 so as to eject seed or grain from the pockets 71.

Secured to the sloping bottom wall 65 of the hopper is an arcuate strap 89 which engages half of the peripheral surface of the rim 73, and said strap is bent and bolted in place as at 90 and the strap 89 is provided with openings 91 arranged beneath the apex 88 of the springs 86. One end of the strap 89 terminates in a sharp edge 116 and the other end of the strap 89 terminates in a straight portion 92 having an opening 93 for receiving one end of a coil spring 94. The other end of the coil spring is affixed to the vertical bracket plate 59 by means of a threaded fastener 95. A coupling nipple 96 is affixed to the band 89 adjacent the opening 91 by means of rivets or the like 97, and a seed tube 98 is received in said coupling 96 to receive seed or grain as well as fertilizer ejected from the pockets 71 of the dispensing wheels 68.

The hopper 64 is provided with a cover 100 which is hingedly connected in place as at 101, and is provided with a hasp 102 pivoted thereto as at 103 for receiving a latching hook 105.

In order to retract the plunger pins 75 after they have moved to their projected position, a pair of star wheels 106 have their hubs 107 mounted on a shaft 108 to rotate freely thereon. The shaft 108 is provided adjacent each end with transverse bores 109 for slidably receiving a pair of parallel guide rods 110 which are arranged obliquely, Figure 6, and have their upper ends threaded and provided with nuts 111 which are welded to the vertical bracket plate 59 as at 112. The opposite ends are provided with heads 113 to limit the movement of the shaft 108 in a downward direction. Coil springs 114 are mounted on the guide rods 110 and have one end in engagement with the shaft 108 and the other end in engagement with the vertical bracket plate 59, to yieldingly urge the star wheels 106 in a direction toward the peripheral surface of the enlarged rim 73. The star wheels are provided with a series of tapered teeth 115 which terminate in blunt pointed portions adapted to project into the pockets 71 and engage the outer ends of the ejector plungers 75 so as to urge them inwardly before the pockets are presented to the hopper discharge opening 67 (Fig. 6). Thus, with the wheel 68 traveling in the direction indicated by the arrow (Fig. 6) seeds may be deposited in the pockets 71 and will be retained in position by the band 89 until they reach the end of their lower rotary travel, at which point the ejector spring 86 will engage the inner ends or heads 76 of the ejector plungers and eject the grain or other material in the pockets through the discharge tube 98. As shown in Figures 6 and 9 the star wheels 106 are presented obliquely and normal to the peripheral surface of the dispensing wheel 68.

For consideration of the operation, the implement frame 5 is connected in draft relationship to a tractor or the like by means of the coupling tongue 6 and the dispensing hoppers are arranged at pre-selected distances on the angle bars 10 and 11 to position the discharge tubes 98 to plant two or more rows the desired spaced apart distances. The movable shaft 34 is then moved away from the gear 18 by manipulating the cam lever 30 so as to shift the casting 21 in a direction away from said gear. The slide 53 is then moved longitudinally on a shaft 34 until the gear 37 is brought opposite a pre-selected concentric ring 20 of gear teeth on the gear 18. After the desired gearing arrangement has been determined, the detent pin 54 is moved into engagement with one of the keeper openings 55 so as to retain the gear in its pre-selected position. Upon movement of the cam lever 30 from the position shown in Figure 4 to that shown in Figure 3, the gear 37 will drivingly engage the pre-selected circular series of gear teeth 20 to cause rotation of the shaft 47 at a predetermined speed. Since the diameter of the wheels 16 is known, and the number of teeth on the gears 18 and 37 is also known, the shaft 47 may be driven such as to rotate the dispensing wheels 68 on the shaft 47 to discharge seed or other material various distances apart ranging from one to seven inches. Thus, the machine may be adapted to planting various seeds for growing different types of plants by simply selecting the position of the interchangeable gear 37.

The operation of the dispensing and discharge apparatus has already been described; and as the seeds reach the opening 91 in the retaining band 89, they are removed therefrom by the ejector pins 75 and said opening is provided with a sharpened edge 116 to insure removal of the seeds or material and to prevent the same from becoming lodged between the peripheral surface of the dispensing rim 73 and the retaining band 89. As shown in Figures 15 and 16 the sharpened edges 116 are formed at the ends of the discharge openings 91 and are presented in a direction opposite to the direction of rotation of the dispensing wheel 68. It will thus be seen that as the pockets 71 are successively brought into registry with the discharge openings 91, that they will alternately discharge through said openings but will be directed downwardly by the seed tube 98.

In Figure 19, there is shown a modified arrangement of the dispensing wheel wherein a pair of identical plates 120 and 120' are provided, and these plates coact to define a housing which surrounds the dispensing wheel 68. The plates 120 and 120' are each provided with an aligned opening 121 through which the rotating shaft 47 extends. The plates 120 and 120' are fastened to the members 58 and 59 by suitable securing elements, such as bolts 122. The upper end of the delivery tube 98 is secured to a nipple 123, and bolts 124 connect the nipple 123 to the bottom of the plates 120 and 120'.

I claim:

1. In a seed and grain dispensing and planting implement, a frame, a pair of transverse frame bars on one end of said frame, a shaft rotatably supported above said frame bars, a plurality of dispensing units mounted on and above said frame bars, rotary dispensing wheels on said shaft and arranged one for each dispensing unit, said rotary dispensing wheels being provided with pockets in their peripheral surface to receive material from said dispensing units, reciprocating ejector plungers for each of said pockets, yielding spring means for projecting said plungers radially outward when said wheels reach the limit of their downward travel, a rotatable star wheel presented to the peripheral surface of each of said dispensing wheels to engage said ejector plungers and move the same to a retracted position as they approach the upper limit of their rotary travel, and hopper means carried by each dispensing unit for feeding material to the pockets as they reach the limit of their upper rotary travel.

2. In a seed and grain dispensing and planting implement, a frame, a pair of transverse frame bars on one end of said frame projecting beyond said wheels, a shaft rotatably supported above said frame bars, a plurality of dispensing units mounted on and above said frame bars, rotary dispensing wheels adjustably mounted along said shaft and arranged one for each dispensing unit, said rotary dispensing wheels being provided with pockets in their peripheral surface to receive material from said dispensing units, reciprocating ejector plungers for each of said pockets, yielding spring means for projecting said plungers radially when said wheels reach the limit of their downward travel, a rotatable star wheel presented to the peripheral surface of each of said dispensing wheels to engage said ejector plungers and move the same to a retracted position as they approach the upper limit of their rotary travel, hopper means carried by each dispensing unit for feeding material to the pockets as they reach the limit of their upper rotary travel, guide means extending about the peripheral surface of the dispensing wheels to retain the material in said pockets during their downward travel.

3. In a seed and material dispensing and distributing implement, a frame, a plurality of dispensing units adjustably mounted on said frame and spaced transversely thereof, a transverse shaft adapted to extend beneath said dispensing units, a rotary dispensing wheel for each of said dispensing units having a series of circumferentially spaced pockets in the peripheral surface thereof, means slidably carried by said wheel for ejecting material fed to said pockets, guide rings mounted on one side of said wheel, and spring means carried by said rings and engaging one end of said last means for controlling the said last named means.

4. In a seed and material dispensing and distributing implement as in claim 3 wherein said dispensing units are positioned at various predetermined distances apart, hopper means for each dispensing wheel to supply individual seeds to said pockets and a pair of star wheels engaging one end of the means for ejecting material fed to said pockets for retracting said last said means.

5. In a seed and material dispensing and distributing implement, a frame, a plurality of dispensing units adjustably mounted on said frame and spaced transversely thereof, a transverse shaft adapted to extend beneath said dispensing units, a rotary dispensing wheel for each of said dispensing units having a series of circumferentially spaced pockets in the peripheral surface thereof, sliding plungers carried by said wheel for ejecting material fed to said pockets, guide rings mounted on one side of said wheel, spring means on said guide rings engaging one end of said sliding plungers for controlling the sliding plungers and said pockets being arranged in two adjacent rows with the pockets of one row staggered with relation to the other row.

6. In a seed and material dispensing and distributing implement, a frame, a plurality of dispensing units adapted to be mounted on said frame in predetermined transversely spaced apart distances one from the other, a transverse shaft adapted to extend beneath said dispensing units, a dispensing wheel associated with each of said dispensing units and movably affixed to said transverse shaft, said dispensing wheel being provided with a series of circumferentially spaced seed receiving pockets in its peripheral surface, hopper means associated with each of said dispensing units to supply seed to said pockets, a series of plungers slidably carried by said dispensing wheel to eject seed and material deposited in said pockets, guide rings mounted on the side of said wheel, spring means mounted on said guide rings and engaging one end of said plungers for moving said plungers radially outward, and means for moving said plungers inward as they approach said hopper means.

RAYMOND L. JOY.

References Cited in the file of this patent

UNITED STATES PATENTS

| Number | Name | Date |
|---|---|---|
| 582,222 | Pace | May 11, 1897 |
| 672,308 | Bristow | Apr. 16, 1901 |
| 700,315 | Fetzer | May 20, 1902 |
| 969,918 | Streitz | Sept. 13, 1910 |
| 978,363 | Franz et al. | Dec. 13, 1910 |
| 1,040,642 | Dalton | Oct. 8, 1912 |
| 1,075,817 | Day | Oct. 14, 1913 |
| 2,097,887 | Lacey | Nov. 2, 1937 |
| 2,354,541 | Radde et al. | July 25, 1944 |
| 2,374,132 | Radde et al. | Apr. 17, 1945 |
| 2,538,754 | Black | Jan. 23, 1951 |